Sept. 25, 1923.
J. OPPMAN
SKID CHAIN FASTENER
Filed June 24, 1921
1,469,103
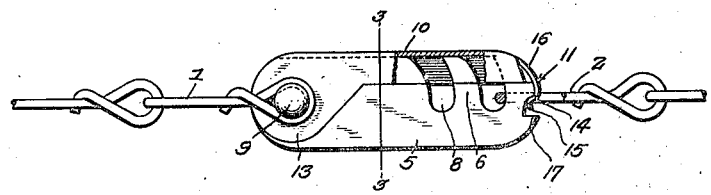
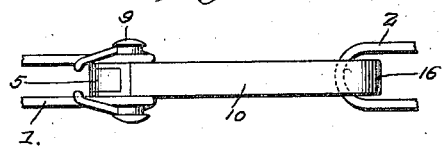
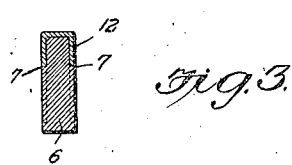 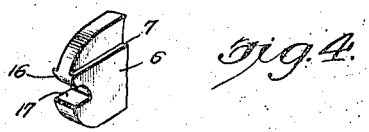
Joseph Oppman, INVENTOR.
BY Geo. F. Kimmel, ATTORNEY.

Patented Sept. 25, 1923.

1,469,103

UNITED STATES PATENT OFFICE.

JOSEPH OPPMAN, OF CONNELLSVILLE, PENNSYLVANIA, ASSIGNOR OF ONE-HALF TO ABE ISADORE DANIELS, OF CONNELLSVILLE, PENNSYLVANIA.

SKID-CHAIN FASTENER.

Application filed June 24, 1921. Serial No. 480,028.

*To all whom it may concern:*

Be it known that I, JOSEPH OPPMAN, a citizen of the United States, residing at Connellsville, in the county of Fayette and State of Pennsylvania, have invented certain new and useful Improvements in Skid-Chain Fasteners, of which the following is a specification.

This invention relates to chain fasteners, and more particularly to devices of this character for securing anti-skid chains upon wheels of motor vehicles.

The object of the invention is the provision of a fastener for the end links of a chain which will be positively but yieldably held in closed position to eliminate the annoyance due to the accidental separation of the chain ends and which can only be opened by force exerted on the end thereof.

Another object is to provide a fastener of this character which is simple in construction and operation and which may be used in connection with chains of various types.

Another object is to provide a fastener of this character having cooperating members so constructed and arranged as to present no obstruction or projection which would be capable of engagement by extraneous objects and cause the separation of said members.

With these and other objects in view, the invention consists in certain novel features of construction as hereinafter shown, described and claimed.

In the accompanying drawings:

Figure 1 represents a side elevation of a chain fastener constructed in accordance with this invention, with parts broken out and in section, the fastener being shown in closed operative position.

Fig. 2 is an end or plan view thereof.

Fig. 3 is a transverse section taken on the line 3—3 of Fig. 1; and

Fig. 4 is a detail perspective view of one end of one of the jaws of the fastener.

In the embodiment illustrated wherein like reference characters designate like or similar parts, sections of an anti-skid chain for vehicle tires are shown of which 1 and 2 are the opposed links to be connected. The link 1 is permanently connected with the fastener which constitutes the invention in a manner presently to be described, while link 2 is detachably connected therewith.

The fastener comprises a body member 5 which is made in the form of a bar, provided at one end with a plurality of longitudinally spaced, laterally extending hooks 6, the terminals of said hooks being of less thickness than the body portion thereof and provided at their junction with said body portion with a shoulder 7 for a purpose presently to be described. These hooks 6 are inclined rearwardly and provided at their bases with receiving openings 8, for the loose link 2 of the chain to be secured.

These hooks 6 are adapted for insertion through the links 2 in one of the chain ends, and for the purpose of holding said link in position a pivoted lock member 10 is provided, having a hook-like closure portion 11 at one end to close the entrance to the openings 8.

The lock or closure member 10 is made channel shape in cross section, and the side walls 12 thereof are of a thickness corresponding to the seats or shoulders 7 formed at the bases of the reduced portions of the hooks 6, so that when said locking member is closed the outer faces of the side walls thereof will be flush with those of the member 5, to avoid all possibility of extraneous objects engaging said walls and accidentally opening the fastener.

The rear ends of the side walls 12 of the member 10 are increased in size and apertured to receive a pintle 9 which connects said member 10 with the member 5, said apertured ears 13 straddling the rear end of member 5, which end is cut out on its opposed side faces to form seats for said member 13 to provide for the flush arrangement of said members with the outer faces of the member 5.

The hook portion 11 which is formed by extending the body portion of the member 10 at the front end thereof and curving it to form a spring hook has a curved bill 14, equipped at its free end with an outturned lip 15 which facilitates the closing of the locking member and also the opening thereof.

The front face of the foremost hook 6 has a recess formed therein below the shoulders 7 thereof and which is cut out to form a curved latch portion 16 for interlocking engagement with the bill 11 of the member 10, as is shown clearly in Fig. 1, while the opposed wall 17 thereof is made rectilinear and is designed to form an abutment for a tool to be inserted between it and the lip 15 of said bill 11, to forcibly disengage said member 11 from the projecting nose or latch 16.

The nose 16 of member 5 projects longitudinally in the path of the spring latch member or bill 11, so that when said member 10 is shut down into locking position, this bill will snap over and interlockingly engage with said nose and hold the member 10 securely locked to the member 5, and prevent all possibility of its being accidentally opened, considerable force exerted on the lip 15 being necessary to disconnect the bill 11 from the nose 16. It is of course understood, that before this member 10 is snapped into locking position, that the loose link 2 of the chain is engaged with one of the hooks 6 and disposed in the seat or recess 8 at the base thereof, as is shown clearly in Fig. 1.

To release the member 10 from the member 5, a screw driver or other implement is inserted between the lip 15 and the abutment formed by the shoulder 17 and a twist given to the screw driver which will operate to forcibly release the spring bill or hook 11 from engagement with the nose 16, and thus permit the member 10 to be swung in to open position for the insertion or removal of the link 2.

It will thus be seen that when the spring latch or bill 11 is engaged with the projecting nose 16 of the fastener, all possibility of the member 10 being accidentally disengaged from the cooperating member 5 is prevented, and the lip 15 of said bill lying within the recess is protected against the engagement therewith of extraneous objects, the shoulder 17 forming a guard therefor.

The link 1 is preferably made substantially U-shaped in form and the legs thereof are provided with eyes which are engaged with the pintle 9 at opposite sides of the fastener as shown clearly in Figs. 1 and 2, the fastener being thereby permanently carried by the chain.

The preferred embodiment of the invention is disclosed in the drawings and set forth in the specification, but it will be understood that any modifications within the scope of the claimed invention may be made in the construction without departing from the principle of the invention or sacrificing any of its advantages.

What I claim is:

1. A fastener of the class described comprising a body member having a link receiving seat with a nose arranged in advance thereof, and a locking member pivotally mounted on said body and having a spring hook to snap down over and interlockingly engage said nose to hold the locking member against accidental opening, said hook having an out-turned lip at its free end and means on the body member for housing said lip, to prevent its accidental engagement with extraneous objects.

2. A fastener of the class described comprising an elongated body member having a plurality of longitudinally spaced hooks projecting upwardly therefrom, the free ends of said hooks being reduced in thickness, and provided with shoulders at their junction with the body portion of the hooks, a locking member channel-shaped in cross section to straddle said body member, and pivotally connected therewith, the walls of said locking member being of a thickness corresponding to the width of said shoulders, to provide for the arrangement of the faces of said members flush with each other when in closed position, and cooperating inter-engaging elements carried by the front ends of said members to lock them against accidental separation.

In testimony whereof, I affix my signature hereto.

JOSEPH OPPMAN.